March 17, 1970  H. F. BOK  3,500,741
BAFFLE STRUCTURE FOR A SPRAY-COATING ENVIRONMENT
Filed Feb. 20, 1969  3 Sheets-Sheet 1

INVENTOR
HENDRIK F. BOK

BY Semmes and Semmes
ATTORNEYS

INVENTOR
HENDRIK F. BOK

BY Semmes and Semmes
ATTORNEYS

INVENTOR
HENDRIK F. BOK

BY Semmes and Semmes
ATTORNEYS

United States Patent Office 3,500,741
Patented Mar. 17, 1970

3,500,741
BAFFLE STRUCTURE FOR A SPRAY-COATING ENVIRONMENT
Hendrik F. Bok, 819 Tucker Road,
North Dartmouth, Mass. 02747
Continuation-in-part of application Ser. No. 676,599, Oct. 19, 1967. This application Feb. 20, 1969, Ser. No. 801,027
Int. Cl. B05b 15/04
U.S. Cl. 98—115     6 Claims

ABSTRACT OF THE DISCLOSURE

A liquid-flowing baffle structure for use in a spray-coating chamber and including a plurality of staggered downwardly inclined channels, defining an end wall of individually flowing liquid streams.

CROSS-REFERENCES TO RELATED APPLICATIONS

A continuation-in-part of Methods for Controlling a Spray-Coating Environment (Ser. No. 676,599), filed Oct. 19, 1967. The parent application was directed to the method of controlling the spray-coating environment by a laminar-flow of filtered air horizontally within the environment, while simultaneously horizontally flowing a solvent liquid through the bottom of the environment and simultaneously vertically flowing solvent liquid as a plurality of staggered downwardly flowing streams at an end of the environment, so as to define a baffle transversely of flowing of the filtered air and at an end of the environment.

This application is directed to a particular baffle structure for the flowing of solvent liquid as a plurality of staggered downwardly flowing streams.

BACKGROUND OF THE INVENTION

Field of the invention

In earlier spray-coating environments solvent for the paint or other material being sprayed into the chamber has been flowed horizontally through the bottom of the environment and vertically downwardly upon the sides of the environment or end wall of the environment. The principal purpose of the flowing of this solvent about the environment is to absorb the "overspray" and "bounce back" occasioned by the spraying operation with the environment, the solvent literally precipitating and dissolving the dry spray dust. The term "solvent" is used to designate any liquid which is compatible with the paint being sprayed to the extent that "overspray" and "bounce back" particles may be dissolved therein. For example, in the spraying of a water base paint, water may be flowed, as the solvent liquid.

According to the present invention, the overspray and bounce back being precipitated in the solvent flowing through the bottom of the environment and at one end of the environment are recirculated with dissolved spray dust by spray-coating.

By recirculating the solvent medium with dissolved spray dust, a spray-coating medium is developed which recovers virtually all of the spray dust and may be ultimately used as the spraying medium. Vertical flowing of the solvent is accomplished over a plurality of vertically upstanding, staggered channels through which the solvent is gravity fed and behind which there is positioned an exhaust fan so as to draw the laminar-flow of filtered air through the baffle, enhancing the absorption of spray dust within the vertically flowing solvent. Spray dust which is not urged against the end baffle falls by gravity into a bottom pan of horizontally flowing solvent where it is recirculated with the solvent recovered at the end baffle.

DESCRIPTION OF THE PREFERRED EMBODIMENTS

Figure 1:
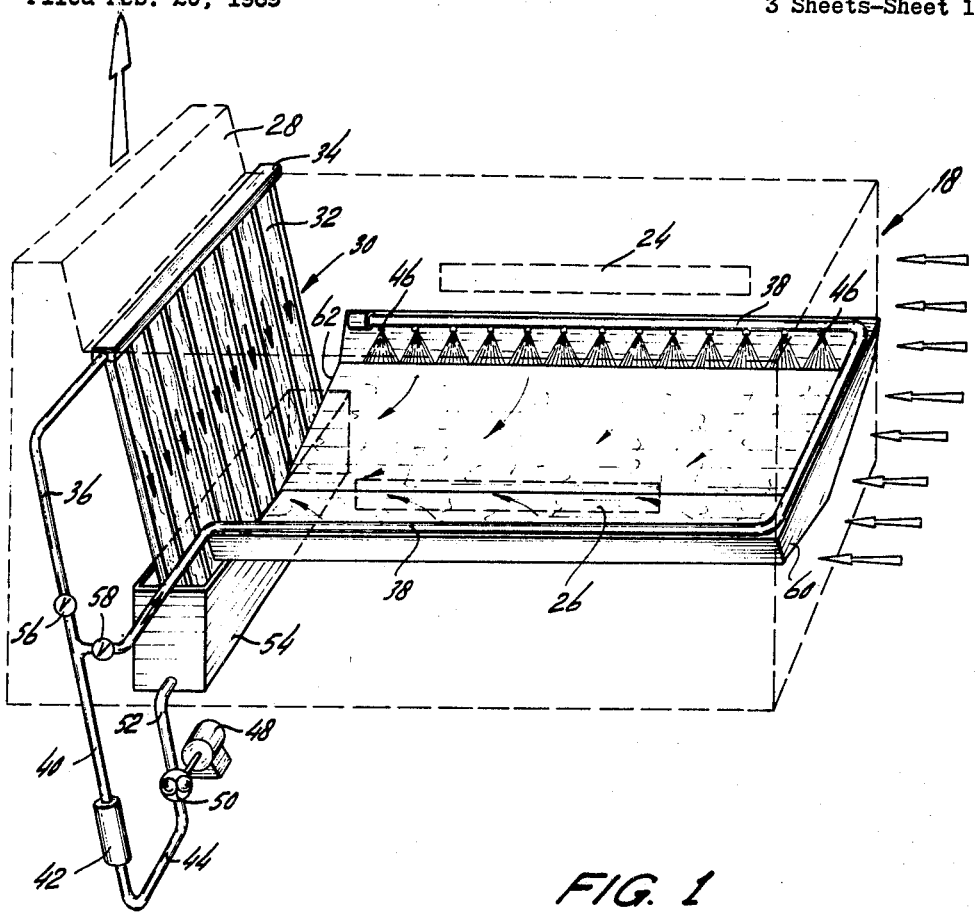
FIG. 1 is a schematic view of a spraying environment (defined in phantom) and showing the systems for horizontal flowing of solvent through the bottom of the environment and vertical flowing of solvent at one end of the environment as a liquid baffle.
Figure 5:
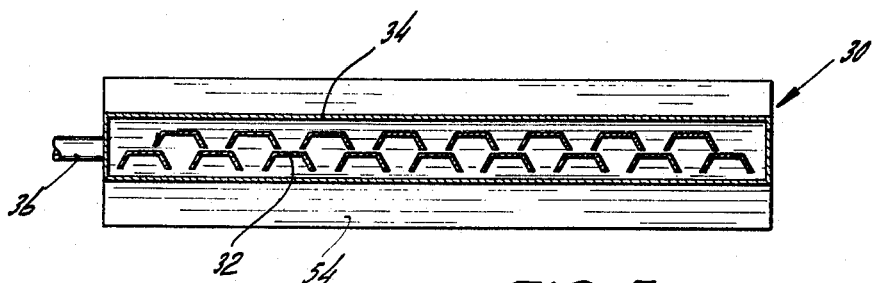
FIG. 5 is a vertical section of the end baffle 30, showing the individual, staggered channels 32.

In FIG. 1 a closed spray-coating environment 18 is outlined with dotted lines and illustrated as having entry portal 26 and exit portal 24 through which a conveyor mechanism carries articles to be spray-coated. An exhaust hood 28 is positioned at one end of the spray-coating environment posteriorly of solvent-wetted end wall baffle 30 comprised of individual, vertically upstanding, overlapped or staggered baffles 32, also illustrated in top plan in FIG. 5. Solvent liquid is introduced through hood 34 for vertical downward flowing as an end baffle transversely of flowing of filtered air. A complementary horizontal flowing solvent pan 60 is positioned beneath the spray-coating environment and has a series of peripheral nozzles 46 connected to feeding conduit 38. The vertical flowing solvent dropping by gravity through wetted wall baffle 30 is collected in pan 54 which receives, also, the horizontal flowing solvent falling as a waterfall at 62 from pan 60. This solvent is recirculated via conduit 52, motor 48, driving gear pump 50, conduit 44, fine, small micron size filter 42, conduit 40 and individual horizontal feeding conduit 38, controlled by needle valve 58, and vertical feeding conduit 36, controlled by needle valve 56.

By varying filtering of the solvent at 42, the size of the precipitates may be precisely controlled so that the recirculated solvent can be developed as a spraying medium. The solvent may be of any type which is compatible with the spray-coating medium and is not readily evaporable. Solvents, employed with photoresists are aromatic types such as xylene and high flash naphtha, ketones, esters and chlorinated solvents. Tri-chlorobenzene and similar slow chlorinated solvents with boiling point over 200° F. can be effectively used where reclaiming of the photoresist is not essential such as in the semi-conductor and micro-circuit industry. By inserting a probe (not illustrated) the changing viscosity of the solvent and resin may be determined. As the viscosity approaches the desired viscosity of the spray-coating medium, the circulated solvent may be withdrawn for spray-coating purposes. Particular photoresist formulations used today range from 7% to 30% solids by volume. By employing both a fast and slow solvent with these solids, for example 80% fast solvent and 20% slow solvent, an exceptionally uniform coating can be achieved.

Figure 2:
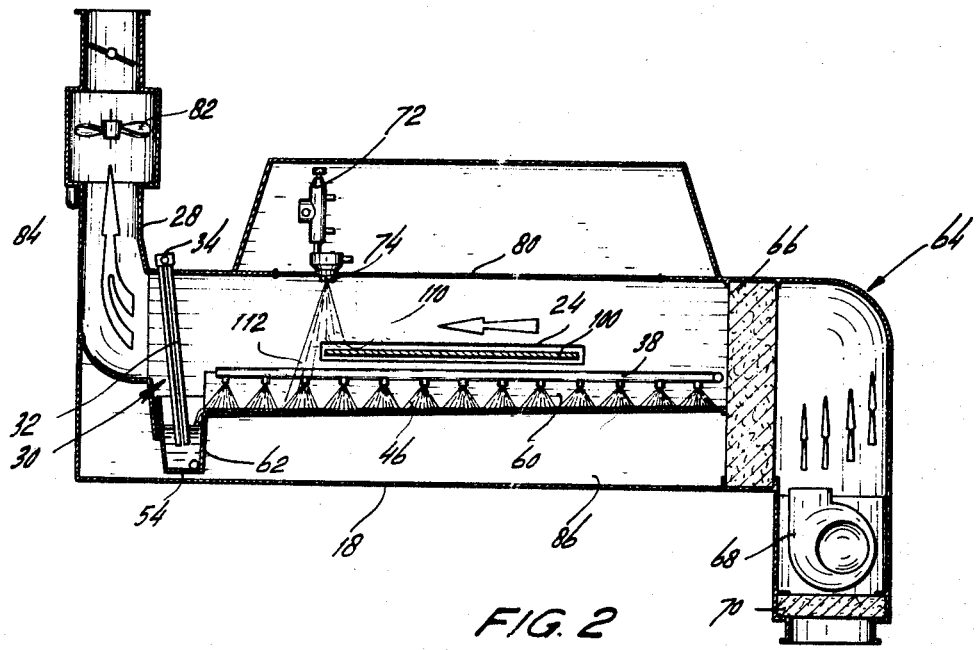
FIG. 2 is a side elevation of the spray-coating environment illustrated in FIG. 1, and showing the system for circulating of the solvent medium with respect to the laminar-flow of filtered air.

In FIG. 2 the bottom pan 60 and end baffle 30 arrangements are shown with respect to conventional spray gun 72, positioned medially of self-circling their stainless steel spring 102 and having nozzle 74 which is reciprocated transversely of the conveyance line through top portal 80. In blower-filter unit 64 laminar-flow air is developed by squirrel cage or similar blower 68 prefiltered at 70 and final filtered with a .3 micron filter 66 to supply a quantity of filtered air sufficient to develop 120–180 linear feet per minute of laminar air movement through the spray-coating environment. A positive overpressure in the spray-coating environment may be developed by regulating exhaust fan 82 to draw air at a slightly lower speed.

Figure 3:
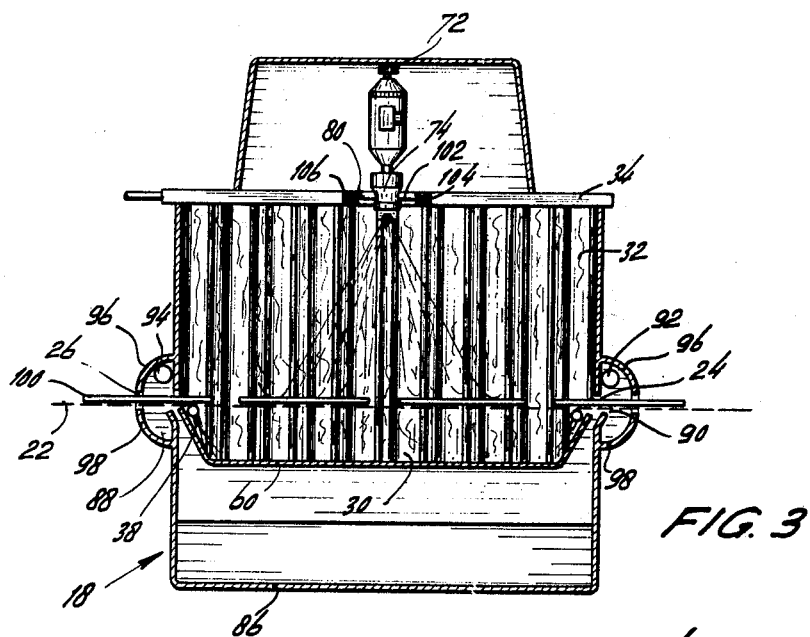
FIG. 3 is a transverse section of the spray-coating environment, illustrated in FIG. 2, and showing the bottom pan and end baffle flowing mediums superposed with respect to the air knife employed at the entry and exit portals of the environment.

In FIG. 3 there is illustrated the positioning of bottom pan 60 and end baffle 30 with respect to an air knife pressurizing chamber 86, for which the filtered air is developed through filter 66. Filtered air is forced from chamber 86 as air knife blade seals 88 and 90 across entry portal 26 and exit portal 24 both being substantially shielded by upper hood 96 and lower hood 98. Air knife seals 88 and 90 may be directed and recovered by slotted suction tubes 94 and 92, suction being developed through the conduit 84 shown fragmentarily in FIG. 3, as communicating with exhaust fan 82.

Figure 4:
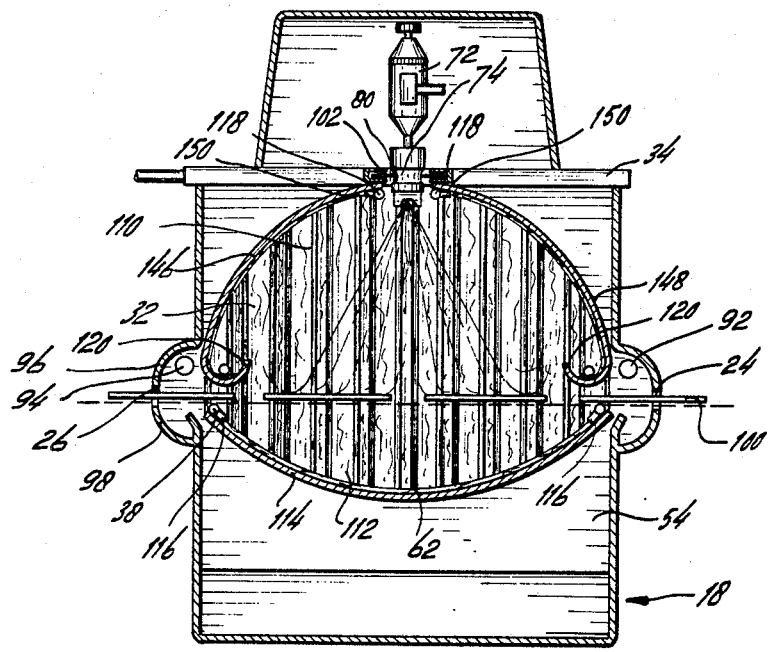
FIG. 4 is a transverse section, similar to that shown in FIG. 3, yet illustrating a modification of invention wherein the solvent liquid is sprayed substantially circumferentially of the laminar-flow, as well as perpendicularly thereto.

A modification of invention is illustrated in FIG. 4 wherein flowing of laminar air is substantially circumferentially enclosed by flowing solvent. According to this modification, a bottom pan 114 is fed by nozzles 116, assuring a horizontal flowing of solvent concurrently with laminar air flow in the bottom of the zone. Top pans 146 and 148 include conduit 118 having nozzles 150 directing solvent flowing onto the upper walls of the chamber or environment. This vertically downward flowing solvent is collected above the conveyor line by lower flanges 120, which may incline towards end baffle 32, permitting collected solvent to fall concurrently with waterfall 62 for collection in pan 54. Bounce back 110 and overspray 112 of spray-coating material settle against the wet surfaces of top pan components 146 and 148 and the wet surface of bottom pan 114.

Manifestly, baffles for horizontal and vertical flowing of solvent may be variously configured, without departing from the spirit and scope of the invention.

I claim:
1. A baffle structure for a spray-coating environment comprising:
 (A) a top hood;
 (B) a collection pan supported beneath said hood;
 (C) a plurality of overlapping, longitudinally staggered baffles extending downwardly from said hood to said collection pan;
 (D) a liquid feeding conduit extending from said collection pan through said hood and having a liquid feeding nozzle communicant with each of said baffles, so as to flow liquid simultaneously vertically downward through said baffles and into said pan, thence from said pan again vertically downward through said baffles;
 (E) a pump positioned in said liquid feeding conduit intermediate said collection pan and said hood;
 (F) a filter positioned in said liquid feeding conduit; and
 (G) a horizontal flowing pan supported within the bottom of said spray-coating environment and inclined so as to flow liquid into said collection pan and having:
  (i) a horizontal feeding conduit extending from said collection pan to the periphery of said horizontal flowing pan.

2. A baffle structure as in claim 1, said horizontal feeding conduit extending from said liquid feeding conduit intermediate said filter and said hood to the periphery of said horizontal flowing pan.

3. A baffle structure as in claim 1, said hood being vertically offset with respect to said pan, so that said channels are downwardly inclined from said hood towards said pan.

4. A baffle structure as in claim 1, said overlapping baffles extending from the top of said environment to said collection pan positioned below said horizontal flowing pan.

5. A baffle structure as in claim 1, said baffles defining an elliptical end wall within said environment.

6. A baffle as in claim 1, in further combination with a source of laminar flow air positioned at an end of said environment opposite said baffle.

References Cited
UNITED STATES PATENTS

| | | | |
|---|---|---|---|
| 1,751,999 | 3/1930 | Hines | 55—241 |
| 2,486,251 | 10/1949 | Braun | 98—115 |
| 2,583,390 | 1/1952 | Paasche | 55—241 X |
| 2,694,466 | 11/1954 | Bingman | 118—326 X |
| 2,848,353 | 8/1958 | Norris | 118—326 X |
| 3,123,455 | 3/1964 | Paasche | 55—241 X |
| 3,132,190 | 5/1964 | Engalitcheff | 55—241 X |

WALTER A. SCHEEL, Primary Examiner

JOHN P. McINTOSH, Assistant Examiner

U.S. Cl. X.R.

118—326